US008272859B2

(12) United States Patent
Hagihara et al.

(10) Patent No.: US 8,272,859 B2
(45) Date of Patent: Sep. 25, 2012

(54) BURNER FOR PRODUCING INORGANIC SPHERICAL PARTICLES

(75) Inventors: Yoshiyuki Hagihara, Kofu (JP); Yasuyuki Yamamoto, Hokuto (JP)

(73) Assignee: Taiyo Nippon Sanso Corporation, Tokyo (JP)

( * ) Notice: Subject to any disclaimer, the term of this patent is extended or adjusted under 35 U.S.C. 154(b) by 48 days.

(21) Appl. No.: 13/057,546

(22) PCT Filed: Aug. 3, 2009

(86) PCT No.: PCT/JP2009/003695
§ 371 (c)(1),
(2), (4) Date: Feb. 4, 2011

(87) PCT Pub. No.: WO2010/016229
PCT Pub. Date: Feb. 11, 2010

(65) Prior Publication Data
US 2011/0135775 A1 Jun. 9, 2011

(30) Foreign Application Priority Data
Aug. 4, 2008 (JP) ................................ P2008-201301

(51) Int. Cl.
*B29B 9/00* (2006.01)
(52) U.S. Cl. ........................ 425/6; 431/181; 431/185
(58) Field of Classification Search ................. None
See application file for complete search history.

(56) References Cited

U.S. PATENT DOCUMENTS

| | | | | |
|---|---|---|---|---|
| 5,558,822 A | * | 9/1996 | Gitman et al. | 264/15 |
| 5,743,930 A | * | 4/1998 | Miyake et al. | 65/142 |
| 6,230,635 B1 | * | 5/2001 | Mukai et al. | 110/347 |
| 2006/0112784 A1 | * | 6/2006 | Sakaguchi et al. | 75/331 |
| 2010/0167054 A1 | * | 7/2010 | Hagihara et al. | 428/402 |

FOREIGN PATENT DOCUMENTS

| | | |
|---|---|---|
| JP | 58-145613 | 8/1983 |
| JP | 62-241543 | 10/1987 |
| JP | 09-313918 | 12/1997 |
| JP | 11-199219 | 7/1999 |
| JP | 2000-205523 | 7/2000 |
| JP | 3312228 | 8/2002 |
| JP | 2005-288399 | 10/2005 |
| JP | 3331491 | 10/2007 |
| JP | 2008-39362 | 2/2008 |

OTHER PUBLICATIONS

Notice of Allowance and English translation in JP 2008-201301 mailed May 24, 2011.
International Search Report for PCT/JP2009/003695, mailed Nov. 10, 2009.

* cited by examiner

*Primary Examiner* — Mary F Theisen
(74) *Attorney, Agent, or Firm* — Nixon & Vanderhye P.C.

(57) ABSTRACT

A burner for production of inorganic spheroidized particles according to the present invention includes a first raw material supply path (1A) through which a raw material powder is supplied together with a carrier gas; a fuel supply path (4A) disposed around the outer circumference of the first raw material supply path (1A), through which a fuel gas is supplied; a primary oxygen supply path (5A) disposed around the outer circumference of the fuel supply path (4A), through which an oxygen-containing gas is supplied; a second raw material supply path (6A) disposed around the outer circumference of the primary oxygen supply path (5A), through which a raw material powder is supplied together with a carrier gas; and a secondary oxygen supply path (7A) disposed around the outer circumference of the second raw material supply path (6A), through which an oxygen-containing gas is supplied.

7 Claims, 4 Drawing Sheets

BURNER FOR PRODUCING INORGANIC SPHERICAL PARTICLES

TECHNICAL FIELD

The present invention relates to a burner used for production of inorganic spheroidized particles, and a production apparatus of inorganic spheroidized particles that uses this burner.

This application is the U.S. national phase of International Application No. PCT/JP2009/003695 filed on Aug. 3, 2009, and claims priority on Japanese Patent Application No. 2008-201301 filed on Aug. 4, 2008, the entire contents of each of which is incorporated herein by reference.

BACKGROUND ART

An inorganic spheroidized particle is obtained by melting a raw material powder produced by crushing silica rock in high-temperature flame and spheroidizing this powder by its surface tension.

For example, highly-pure spheroidized silica that is obtained by using silica rock as a raw material is widely used as a filler for an epoxy-sealing material of a semiconductor device, and a lot of merits such as improved fluidity of a sealing material, high filling amount, and improved abrasion resistance can be obtained by spheroidizing.

In the present description, an inorganic spheroidized particle may be simply described as a spheroidized particle.

As a prior art regarding the production of an inorganic spheroidized particle, there are the methods disclosed in Patent Literatures 1 to 4.

Because high-temperature flame is needed for the spheroidizing of raw material powder, a burner of an oxygen-gas combustion system is usually used.

Examples of the burner include a premixing type burner and a diffusion type burner. In a premixing type burner, oxygen and a fuel gas are preliminarily mixed and ejected to the combustion place. Meanwhile, in a diffusion type burner, oxygen and a fuel gas are separately ejected and mixed at the combustion place.

The premixing type burner is used in the method disclosed in Patent Literature 2, while the diffusion type burner is used in the methods disclosed in Patent Literatures 1, 3 and 4.

The diffusion type burner disclosed in Patent Literature 1 has the concentric double pipe in which a lot of small pipes are provided between the inner pipe and the outer pipe. This burner is disposed in a vertical furnace, a silicon raw material is flowed down spontaneously or flowed down with pressurization through the central pipe (inner pipe) of the burner, and the raw material powder is supplied into flame made by a fuel gas from the small pipes and an oxygen gas from the outer pipe to thereby produce a melted silica spheroidized body.

In the premixing type burner disclosed in Patent Literature 2, raw material powder, oxygen, and LPG are sufficiently mixed in a burner, and the raw material powder is supplied into flame made at the end of the burner.

The diffusion type burners disclosed in Patent Literatures 3 and 4 have the concentric quartet pipe structure in which a raw material powder is supplied into the combustion chamber from the center using oxygen or an oxygen-enriched air as a carrier gas, a fuel gas is supplied through the outer circumference thereof, the primary oxygen and the secondary oxygen are supplied through the further outer circumference thereof, and cooling water path is provided around the most outer circumference to thereby cool a burner.

In addition, Patent Literatures 3 and 4 disclose an apparatus that uses such a diffusion type burner to produce inorganic spheroidized particles.

In the production apparatus of inorganic spheroidized particles disclosed in Patent Literature 4, as shown in FIG. 6, a raw material powder is cut off from a raw material feeder A and carried to a burner B, together with a carrier gas that is supplied through a carrier gas supply device A'. Into the burner B, oxygen from an oxygen supply equipment C and a liquefied petroleum gas (LPG) from a LPG supply equipment D are supplied.

An exhaust gas containing particles spheroidized in flame in a vertical furnace E are cooled with air introduced into the bottom portion of the vertical furnace E through a path F, and then the spheroidized particles are collected by the following cyclone G and bag filter H.

CITATION LIST

Patent Literature

[Patent Literature 1]
Japanese Unexamined Patent Application, First Publication No. Sho 58-145613
[Patent Literature 2]
Japanese Unexamined Patent Application, First Publication No. Sho 62-241543
[Patent Literature 3]
Japanese Patent No. 3,331,491
[Patent Literature 4]
Japanese Patent No. 3,312,228

SUMMARY OF INVENTION

Technical Problem

In the premixing type burner disclosed in Patent Literature 2, oxygen and a fuel fluid such as LPG are preliminarily mixed in the burner. This type of the burner has such a structure that a mixture of oxygen and a fuel gas is ejected from the end of a nozzle, and therefore, there is a possibility of backfire into the burner.

Meanwhile, in the diffusion type burner disclosed in Patent Literature 1, there is no possibility of backfire, but the raw material ejection hole and the fuel ejection hole are adjacent, and therefore, raw material particles are ejected into the low-temperature flame that is not mixed well with oxygen. For this reason, the problems were found in which the sufficient heating due to the flame could not be achieved and the melting state was insufficient, resulting in low vitrification ratio of particles. It is considered that spheroidized particles having a vitrification ratio of less than 98% are not preferred from the viewpoint of thermal expansion when the spheroidized particles used as fillers for a sealing material of a semiconductor device.

On the other hand, the raw material powder is heated and melted in flame by forced convective heat transfer mainly due to the flame, and is spheroidized by its surface tension.

In the diffusion type burners having the structure disclosed in Patent Literatures 3 and 4, the combustion chamber is provided, and the aggregation state of the produced inorganic spheroidized particles is improved in comparison with the burner disclosed in Patent Literature 1.

However, when raw material powders with various mean particle diameters were spheroidized in the same combustion amount, the tendency was found in which as the mean particle diameter of the raw material powder decreases, the aggregation was enhanced and the spheroidizing amount decreased.

In addition, the tendency was found in which the mean particle diameter of the spheroidized particles processed by the flame became larger than the mean particle diameter of the raw material powder.

Therefore, it was found that the burners disclosed in Patent Literatures 3 and 4 were insufficient to obtain the spheroidized particles with smaller mean particle diameter.

In case a raw material powder with wide particle size distribution obtained by ball mill crushing using this burner is treated, since fusion between fine particles or fusion between fine and coarse particles occurs in the flame, there could be observed a situation in which particle size distribution of the charged raw material powder is different from that of the obtained spheroidized particle product.

Thus, an object of the present invention is to provide a burner for production of inorganic spheroidized particles, which has no possibility of backfire and can produce inorganic spheroidized particles having a high vitrification ratio, and also can produce spheroidized particles having the objective particle size distribution without causing a variation in a mean particle diameter of a raw material powder during the process of granulation, and a production apparatus of inorganic spheroidized particles.

Solution to Problem

In order to achieve the aforementioned objects, a first aspect of the present invention is a burner for production of inorganic spheroidized particles, including a first raw material supply path through which a raw material powder is supplied together with a carrier gas;

a fuel supply path disposed around the outer circumference of the first raw material supply path, through which a fuel gas is supplied;

a primary oxygen supply path disposed around the outer circumference of the fuel supply path, through which an oxygen-containing gas is supplied;

a second raw material supply path disposed around the outer circumference of the primary oxygen supply path, through which a raw material powder is supplied together with a carrier gas;

a secondary oxygen supply path disposed around the outer circumference of the second raw material supply path, through which an oxygen-containing gas is supplied;

a raw material diffusion chamber connected to the end of the first raw material supply path through a powder diffusion plate having a lot of fine holes; and a combustion chamber connected to the raw material diffusion chamber, that has a radially expanded exit side; wherein each of the ends of the fuel supply path, the primary oxygen supply path, the second raw material supply path and the secondary oxygen supply path is opened to a conical wall surface of the combustion chamber;

openings of the fuel supply path are ejection holes that eject a fuel in parallel to a central axis of the burner from the wall surface of the combustion chamber;

openings of the primary oxygen supply path are primary oxygen ejection holes that eject an oxygen-containing gas in a direction of formation of rotational flow in the combustion chamber from the wall surface of the combustion chamber;

openings of the second raw material supply path are ejection holes opened to the end side of the burner from the primary oxygen ejection holes; and openings of the secondary oxygen supply path are ejection holes opened to the end side of the burner from second raw material ejection holes.

A second aspect of the present invention is an apparatus for production of inorganic spheroidized particles, including a vertical spheroidization furnace equipped with the burner at the top portion of the furnace in a vertically downward direction; and a cyclone and a bag filter that are disposed at the downstream side of the spheroidization furnace to collect inorganic spheroidized particles.

In the second aspect of the present invention, it is preferred to be equipped with control means for independently controlling a carrier gas and a raw material powder that are supplied to a first raw material supply path and a second raw material supply path of the burner, respectively.

In the second aspect of the present invention, it is preferred to include a path that is connected to a bag filter through a cyclone, and a path that is connected to the bag filter without through the cyclone, each path being switchable.

In the second aspect of the present invention, it is preferred to be provided with two raw material supply devices of supplying raw material powders each having a different particle diameter in the first raw material supply path and the second raw material supply path of the burner.

In the second aspect of the present invention, it is preferred that the cyclone collects coarse particles, and the bag filter collects fine particles.

In the second aspect of the present invention, it is preferred that the bag filter collects particles in one lump.

Advantageous Effects of Invention

The burner of the present invention is a diffusion type burner, and therefore, backfire does not occur. Moreover, when a raw material powder having a large particle diameter is supplied to a first raw material supply path and a raw material powder having a small particle diameter is supplied to a second raw material supply path, particles having a small particle diameter can be sufficiently melted in a region where the temperature of the flame outer circumference portion is low and particles having a large particle diameter can be sufficiently melted in a region where the temperature of the flame center portion is high. Also, since the particles having a small particle diameter have not satisfactory dispersibility, it is possible to eject the particles from the second raw material supply path that enables an increase in dispersion volume, and to satisfactorily disperse in the flame. On the other hand, since the particles having a large particle diameter have satisfactory dispersibility, it is possible to eject the particles from the second raw material supply path that enables a decrease in dispersion volume, and to satisfactorily disperse in the flame.

Therefore, according to the production apparatus of spheroidized particles of the present invention, it is possible to spheroidize both particles having a large particle diameter and particles having a small particle diameter while nearly maintaining the particle diameter and to obtain particles having a high vitrification ratio.

Accordingly, it is possible to produce spheroidized particle having a particle diameter or particle size distribution corresponding to the raw material supplied.

DESCRIPTION OF EMBODIMENTS

Figure 1:
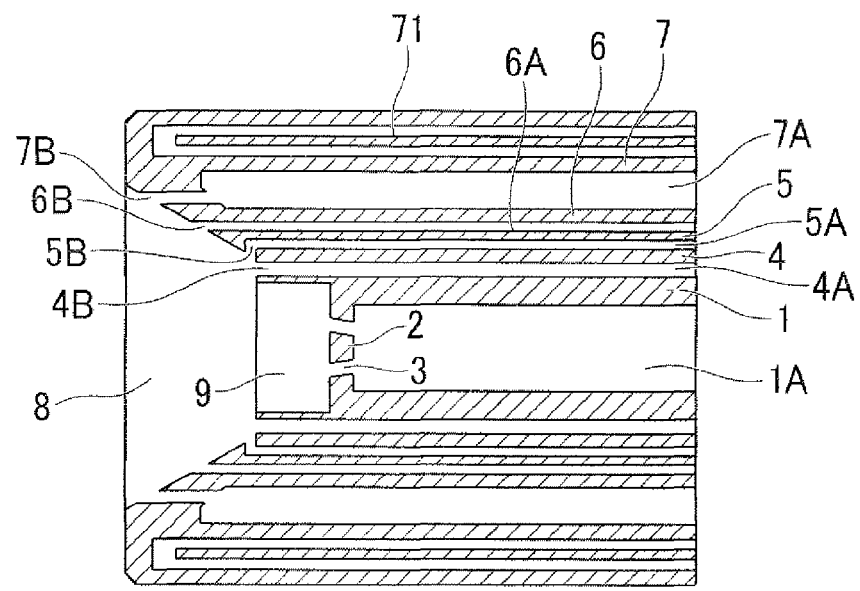
FIG. 1 is a schematic sectional view illustrating an example of a burner of the present invention.
Figure 2:
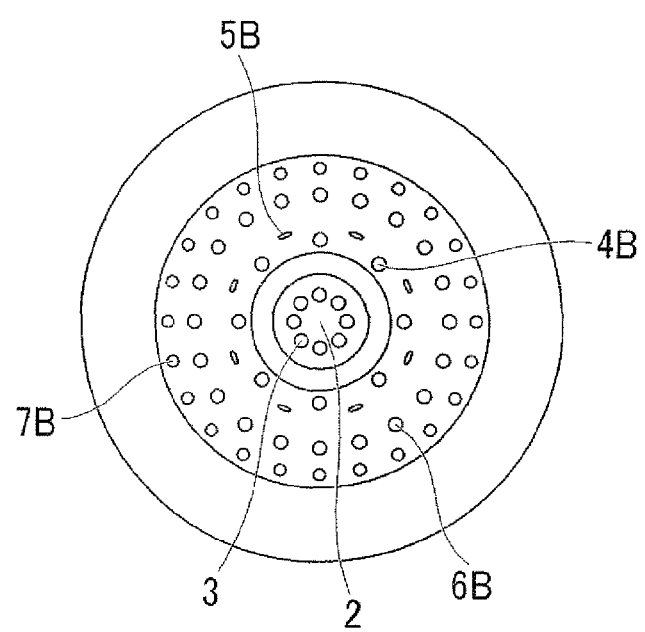
FIG. 2 is a schematic side view illustrating an example of a burner of the present invention.

FIG. 1 and FIG. 2 illustrate an example of a burner for production of inorganic spheroidized particles of the present invention (hereinafter may be simply referred to as a burner). FIG. 1 is a sectional view in which the burner is cut along the central axis thereof. FIG. 2 is a side view when the burner is viewed from the end side thereof, which illustrates only the ejection holes for raw material powder, fuel, and oxygen.

In these figures, the reference sign 1 represents a first raw material supply pipe whose inside forms the first raw material supply path 1A through which a mixture of raw material powder and a carrier gas is supplied.

As a carrier gas, an oxygen-containing gas having an oxygen concentration of 20 vol % or more such as oxygen, oxygen-enriched air having an oxygen concentration of 20 vol % or more, or air is used.

As the raw material powder, inorganic powder such as silicon oxide, aluminum oxide, or glass, the particle morphology being a nonspherical shape with a corner, is used.

Among the raw material powder, a coarse particle refers to a powder having a large particle diameter, whose mean particle diameter is 10 μm or more, while a microsphere refers to a powder having a small particle diameter, whose mean particle diameter is less than 10 μm.

This first raw material supply pipe 1 is equipped with a powder diffusion plate 2 at the exit end thereof. This powder diffusion plate 2 ejects the mixed powder of the raw material powder and the carrier gas so that it spreads radially toward a burner exit direction. A plurality of first raw material ejection hole 3, 3••, which are directed obliquely outward, are formed on a circle at regular intervals.

Outside the first raw material pipe 1, a fuel supply pipe 4 is provided concentrically, and the space between the raw material supply pipe 1 and the fuel supply pipe 4 forms a fuel supply path 4A. Through this fuel supply path, a fuel gas such as a liquefied petroleum gas (LPG) is supplied. The exit end of the fuel supply path 4A forms a plurality of fuel gas ejection holes 4B, 4B••, so that the fuel is ejected in a direction parallel to the central axis of the burner. These plural fuel gas ejection holes 4B, 4B•• are formed on a circle at regular intervals.

Outside the fuel supply pipe 4, a primary oxygen supply pipe 5 is provided concentrically, and the space between the fuel supply pipe 4 and the primary oxygen supply pipe 5 forms a primary oxygen supply path 5A. Through the primary oxygen supply path 5A, an oxygen-containing gas having the oxygen concentration of 20 vol % or more such as oxygen, an oxygen-enriched air having the oxygen concentration of 20 vol % or more or air is supplied.

The exit end of the primary supply path 5A forms a plurality of primary oxygen ejection holes 5B, 5B•• and exits of these primary oxygen ejection holes 5B, 5B•• are opened toward a central axis of the burner, so that oxygen is ejected in a direction vertical to the central axis of the burner and a rotational flow is formed in a combustion chamber 8 described hereinafter.

These plural primary oxygen ejection holes 5B, 5B•• are formed on a circle at regular intervals, and also disposed on a circle at the position different from that of the plurality of fuel ejection holes 4B, 4B••, in the middle between the adjacent two fuel ejection holes 4B, 4B••.

Outside the primary oxygen supply pipe 5, the second raw material supply pipe 6 is provided concentrically, and the space between the primary oxygen supply pipe 5 and the second raw material supply pipe 6 forms a second raw material supply path 6A. The exit portion of the second raw material supply path 6A forms a plurality of second raw material ejection holes 6B, 6B••, so that a raw material is ejected in a direction parallel to the central axis of the burner.

The plurality of second raw material ejection holes 6B, 6B•• are formed on a circle at regular intervals.

Outside the second raw material supply pipe 6, the secondary oxygen supply pipe 7 is provided concentrically, and the space between the second raw material supply pipe 6 and the secondary oxygen supply pipe 7 forms a secondary oxygen supply path 7A. This secondary oxygen supply path 7A has a wider cross-section than the primary oxygen supply path 5A so that a large amount of oxygen can be supplied. The exit end of the secondary oxygen supply path 7A forms a plurality of secondary oxygen ejection holes 7B, 7B•• and these secondary oxygen ejection holes 7B, 7B•• are formed on a circle at regular intervals. These secondary oxygen ejection holes 7B, 7B•• are opened in parallel to a central axis of the burner, so that an oxygen-containing gas is ejected in a direction parallel to the central axis of the burner.

Moreover, the secondary oxygen supply pipe 7 has a thick pipe wall, and a cooling water path 71 through which cooling water flow is formed inside the pipe to cool the burner itself.

Furthermore, the end portion of the burner is dented in a mortar shape that broadens outward, and this part forms a combustion chamber 8.

In other words, the inclined pipe wall portion of the combustion chamber 8 is constituted by obliquely forming the end portions of the secondary oxygen supply pipe 7, the second raw material supply pipe 6 and the primary oxygen supply pipe 5, and also the bottom portion of the combustion chamber 8 corresponds to a cylindrical raw material diffusion chamber 9. The raw material diffusion chamber 9 is formed by extension of the exit end portion of the raw material supply pipe 1 in a thin-walled cylindrical form toward the end portion of the burner in comparison with the powder diffusion plate 2.

Furthermore, on the conical wall surface of the combustion chamber 8, fuel gas ejection holes 4B, 4B••, primary oxygen ejection holes 5B, 5B••, second raw material ejection hole 6B, 6B•• and secondary oxygen ejection holes 7B, 7B•• are respectively opened.

Moreover, the above second raw material ejection holes 6B are opened at the end side of the burner in comparison with the primary oxygen ejection holes 5B, while the above secondary oxygen ejection holes 7B are opened at the end side of the burner in comparison with the second raw material ejection holes 6B.

In the burner for production of inorganic spheroidized particles, that has such a structure, the end of the first raw material supply path 1A is connected to the raw material diffusion chamber 9 through the powder diffusion plate 2 having a lot of holes, and the fuel gas supply path 4A provided on the outer circumference of the first raw material supply path 1A and the primary oxygen supply path 5A provided on the outer circumference of the fuel gas supply path 4A are opened toward the combustion chamber 8 whose exit side connected to the end of the respective supply paths is radially expanded, and thus dispersibility of the raw material powder in the burner flame is improved.

When raw material powders each having a different particle diameter are supplied to the first raw material supply path 1A and the second raw material supply path 6A, it is possible to treat particles having a large mean particle diameter in the region where a temperature of the flame center portion is high and to treat particles having a small mean particle diameter in the region where a temperature of the flame outer circumference portion is low, while efficiently dispersing the particles.

The particles having a large mean particle diameter are dispersed comparatively easily and are therefore supplied from the first raw material supply path 1A having a small dispersion area, located at the flame center portion. The particles having a small mean particle diameter are not easily dispersed, and are therefore supplied into the flame from the second raw material supply path 6A having a large dispersion area. Thereby, the raw material powder can be efficiently dispersed into the flame.

Figure 3:
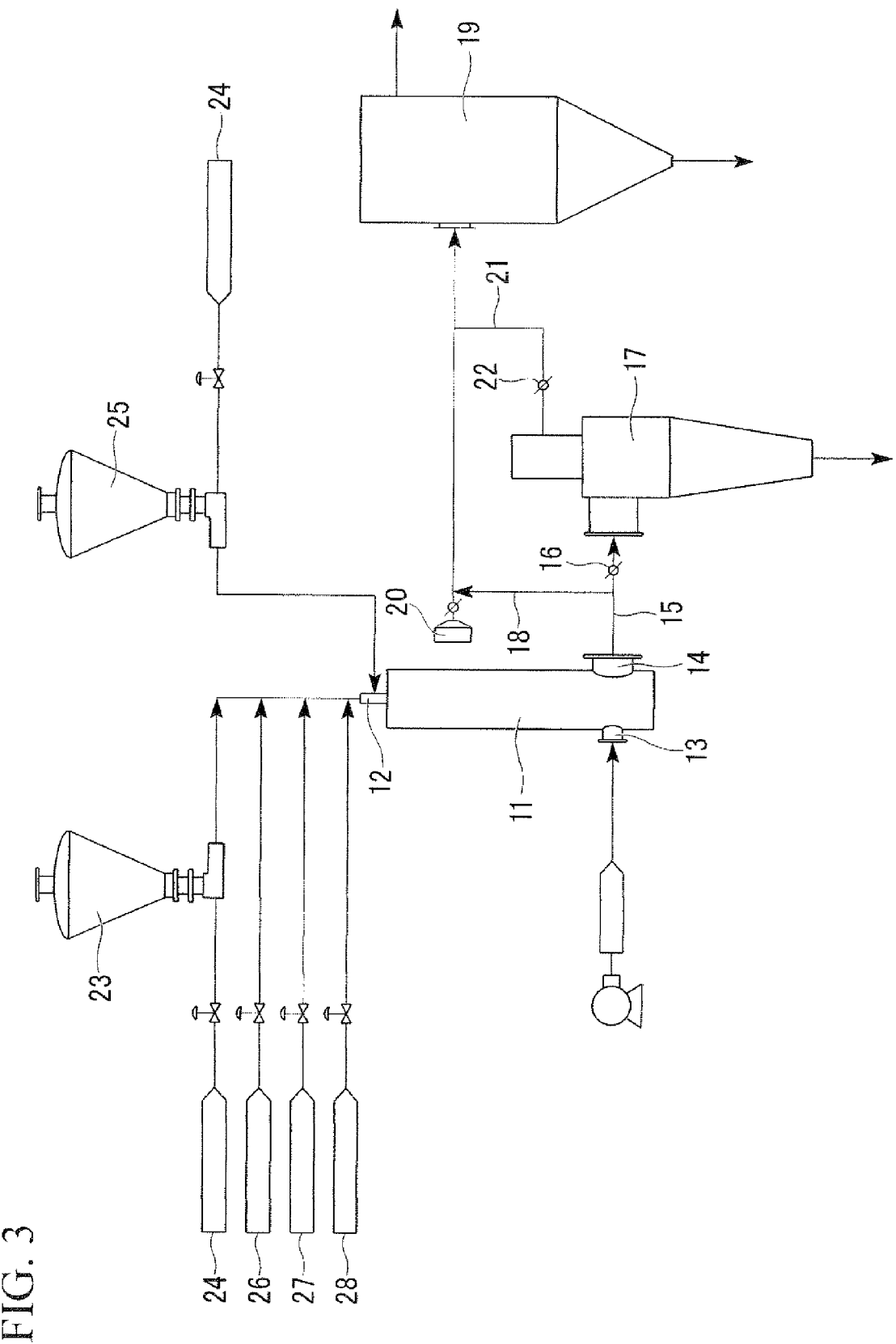
FIG. 3 is a schematic configuration diagram illustrating a production apparatus of inorganic spheroidized particles of the present invention.

Therefore, in the present invention, it is possible to treat the particles having a large mean particle diameter and the particles having a small mean particle diameter at a time in an optimum state in one burner FIG. 3 illustrates an example of a production apparatus of inorganic spheroidized particles of the present invention, in which the reference sign 11 denotes a spheroidization furnace. This spheroidization furnace 11 is a cylindrical vertical furnace and is equipped vertically with the above burner 12 at the ceiling portion so that the end side faces inside the furnace.

In the vicinity of the bottom portion of the spheroidization furnace 11, an air intake port 13 is formed, whereby, cooling air is introduced into the furnace from the inlet thereby reducing the temperature of a combustion gas to be discharged.

In the vicinity of the bottom portion of the spheroidization furnace 11, a combustion gas discharge exit 14 is formed, whereby, the produced spheroidized particles are transported to a combustion gas, discharged and then transferred to the inlet of a cyclone 17 through a duct 15 and a damper 16.

The duct 15 is connected to a duct 18 and branched at the upstream side of the damper 16, and this duct 18 is connected to the inlet of a bag filter 19.

In the duct 18, an air intake port 20 is disposed on the way and, by appropriately intaking air into the duct 18 through the port 20, the temperature of combustion gas flowing in the duct 18 can be adjusted by lowering.

Moreover, a duct 21 is connected to the exit of the cyclone 17 and this duct 21 is connected to an inlet of the bag filter 19 through a damper 22.

The first raw material supply pipe (not shown) is connected to the first raw material supply path 1A of a burner 2 and this first raw material supply pipe is connected to a first raw material feeder 23. In the first raw material feeder 23, a raw material powder in the form of coarse particles having a coarse particle diameter are stored and a carrier gas from a carrier gas supply source 24 is transferred, and then a predetermined amount of a raw material powder is transported to this carrier gas and transferred to the first raw material supply path 1A of the burner 2 through the above first raw material supply pipe.

The first raw material feeder 23 is equipped with a delivery system for delivering a predetermined amount of a raw material powder in response to a raw material powder supply amount control signal from a control device (not shown).

As the carrier gas, an oxygen-containing gas having the oxygen concentration of 20 vol % or more such as oxygen, oxygen-enriched air or air is used.

The carrier gas supply source 24 is also equipped with a flow regulating valve for delivering a predetermined amount of a carrier gas to a first raw material feeder 23 and a second raw material feeder 25, respectively, in response to a carrier gas supply amount control signal from a control device (not shown).

A second raw material supply pipe (not shown) is connected to the second raw material supply path 6A of the burner 2, and this second raw material supply pipe is connected to the second raw material feeder 25. In the second raw material feeder 25, a raw material powder in the form of micro spheres having a fine particle diameter is stored and a carrier gas from the carrier gas supply source 24 is transferred, and then a predetermined amount of the raw material powder is transported to this carrier gas and transferred to the second raw material supply path 6A of the burner 2 through the above second raw material supply pipe.

The second raw material feeder 25 is also equipped with a delivery system for delivering a predetermined amount of a raw material powder in response to raw material powder supply amount control signal from a control device (not shown).

A fuel supply pipe (not shown) is connected to the fuel supply path 4A of the burner 2 and this fuel supply pipe is connected to a combustion gas supply source 26. The fuel gas supply source 26 is allowed to store a fuel gas such as a liquefied petroleum gas (LPG) or a liquefied natural gas (LNG) therein, that are to be delivered, and a predetermined amount of the fuel gas is transferred to the fuel supply path 4A of the burner 2 through the above fuel gas supply pipe.

The fuel gas supply source 26 is equipped with a delivery system for delivering a predetermined amount of a fuel gas in response to a fuel gas supply amount control signal from a control device (not shown).

A primary oxygen supply pipe (not shown) is connected to the primary oxygen supply path 5A of the burner 2, and this primary oxygen supply pipe is connected to a primary oxygen supply source 27. The primary oxygen supply source 27 is allowed to store an oxygen-containing gas therein, that are to be delivered, and a predetermined amount of the oxygen-containing gas is transferred to the primary oxygen supply path 5A of the burner 2 through the above primary oxygen supply pipe.

The primary oxygen supply source 27 is equipped with a delivery system for delivering a predetermined amount of an oxygen-containing gas in response to a primary oxygen supply amount control signal from a control device (not shown).

A secondary oxygen supply pipe (not shown) is connected to the secondary oxygen supply path 7A of the burner 2, and this secondary oxygen supply pipe is connected to a secondary oxygen supply source 28. The secondary oxygen supply source 28 is allowed to store the above oxygen-containing gas therein, that are to be delivered, and a predetermined amount of the oxygen-containing gas is transferred to the secondary oxygen supply path 7A of the burner 2 through the above secondary oxygen supply pipe.

The secondary oxygen supply source 28 is also equipped with a delivery system for delivering a predetermined amount of an oxygen-containing gas in response to a secondary oxygen supply amount control signal from a control device (not shown).

It is also possible that the primary oxygen supply source 27 is integrated with the secondary oxygen supply source 28 and the integrated source is provided with two delivery systems, and then an oxygen-containing gas is separately delivered to a primary oxygen supply pipe and a secondary oxygen supply pipe from each delivery system and a predetermined amount of the oxygen-containing gas is respectively supplied to the primary oxygen supply path 5A and the secondary oxygen supply path 7A of the burner 2.

Hereinafter, a production method of spheroidized particles using such a production apparatus will be described.

From a first raw material feeder 23, a raw material powder, for example, coarse particles having a particle diameter of 10 μm or more are transferred to a first raw material supply path 1A of a burner 12, and then ejected toward a combustion chamber 8 from first raw material ejection holes 3 through a raw material diffusion chamber 9. From a second raw material feeder 25, a raw material powder, for example, microspheres having a particle diameter of less than 10 μm are transferred to a second raw material supply path 6A of a burner 12, and then ejected toward a combustion chamber 8 from a second raw material ejection hole 6B.

Herein, the reason why the supply destination of the raw material powder is divided by the mean particle diameter of 10 μm is that the raw material powder having the mean particle diameter of less than 10 μm has characteristics such as poor dispersibility.

A predetermined amount of an oxygen-containing gas is fed into a primary oxygen supply path 5A and a secondary oxygen supply path 7A of a burner 12, respectively, from a primary oxygen supply source 27 and a secondary oxygen supply source 28, and then ejected toward a combustion chamber 8 through primary oxygen ejection holes 5B and secondary oxygen ejection holes 7B.

A predetermined amount of a fuel gas is fed into a fuel supply path 4A of a burner 12 from a fuel gas supply source 26, and then ejected toward a combustion chamber 8 through fuel gas ejection holes 4B.

Two kinds of raw material powders each having a different particle diameter ejected into the flame are respectively melted by heating in a central region at a high temperature and an outside region at a low temperature and then spheroidized to give spheroidized particles each having a different particle diameter.

These spheroidized particles are transferred to a cyclone 17 from a combustion gas discharge exit 14 of a spheroidization furnace 11 through a duct 15 and a damper 16 while floating on a gas of a combustion gas produced from a burner 2 and air to be introduced from an air intake port 13. By mixing the combustion gas with air, the temperature of the gas to be introduced into the cyclone 17 decrease to reach the temperature suited for collection of the particles in the cyclone 17.

In the cyclone 17, among the spheroidized particles floating in the gas, only spheroidized particles in the form of coarse particles are collected. The gas discharged from the cyclone 17 is transferred to a bag filter 19 through a duct 21, where spheroidized particles in the form of microspheres among the spheroidized particles are collected.

If necessary, the damper 16 of the duct 15 is closed, and a gas is allowed to flow in the duct 18 and is directly transferred to the bag filter 19, thus making it possible to collect all spheroidized particles in the bag filter. In this case, when the temperature of the gas must be lowered, an appropriate amount of air can also be mixed in the gas from an air intake port 20.

It is possible to efficiently obtain spheroidized particles having a particle diameter, which nearly agrees with that of a raw material powder, by the above operation.

EXAMPLES

Hereinafter, specific examples are described.

Example 1

Using the production apparatus of inorganic spheroidized particles shown in FIG. 3, spheroidized particles were produced.

As the entire raw material powder, a silica powder at 20 kg/h was transported with oxygen at 7.5 $Nm^3/h$ as a carrier gas. As a fuel gas, LPG at 5 $Nm^3/h$ was supplied. As the entire oxygen-containing gas, each half of oxygen at 20 $Nm^3/h$ was dividedly introduced into a burner 12 to produce spheroidized particles, and then a spheroidization throughput capacity that achieves a vitrification ratio of 98% or more was determined.

At this time, each proportion of oxygen to be supplied to the above primary oxygen ejection holes 5B (primary oxygen) and the secondary oxygen ejection holes 7B (secondary oxygen) was changed within a range from 0 to 100% (primary oxygen) and a range from 100 to 0% (secondary oxygen), according to the particle size of the raw material powder, and thus studying the condition that can achieve the vitrification ratio of 98% or more.

Figure 4:
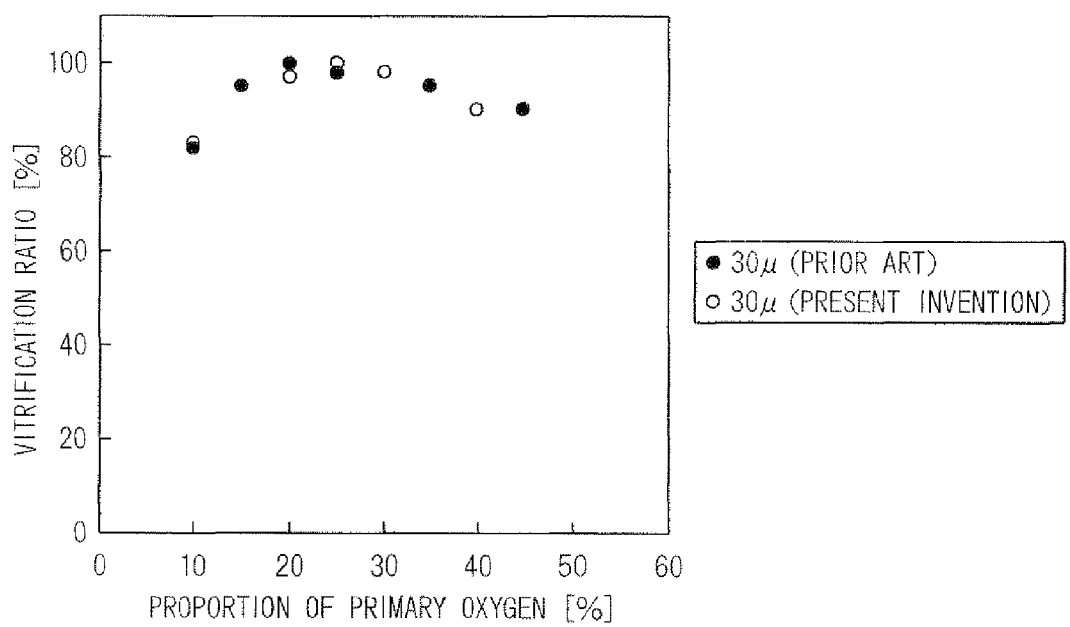
FIG. 4 is a graph illustrating a relation between the flow rate and the vitrification ratio of primary oxygen and secondary oxygen in Example.
Figure 5:
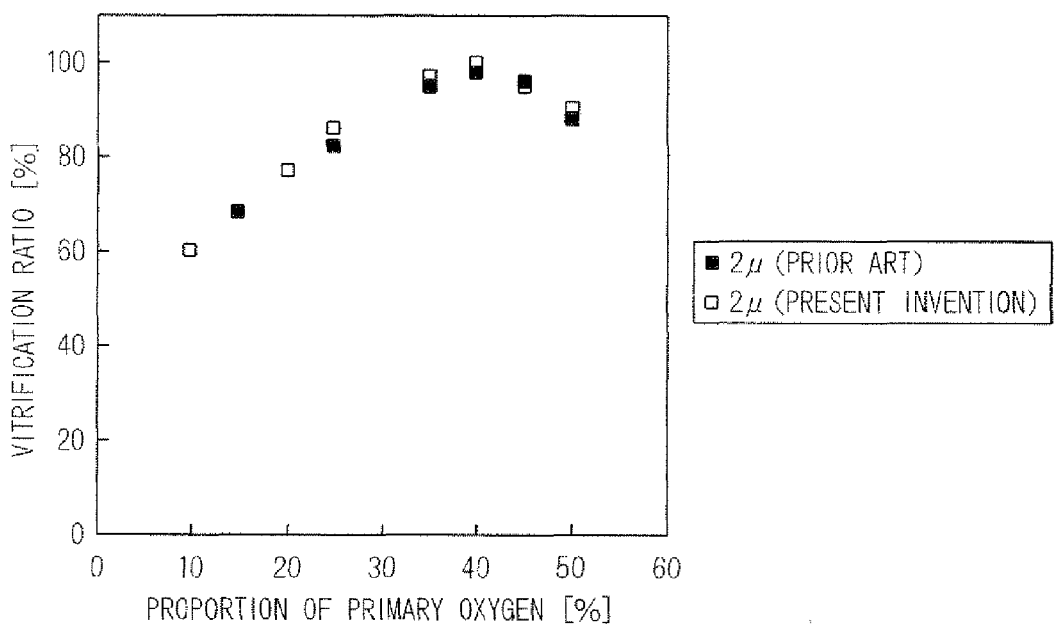
FIG. 5 is a graph illustrating a relation between the flow rate and the vitrification ratio of primary oxygen and secondary oxygen in Example.
Figure 6:
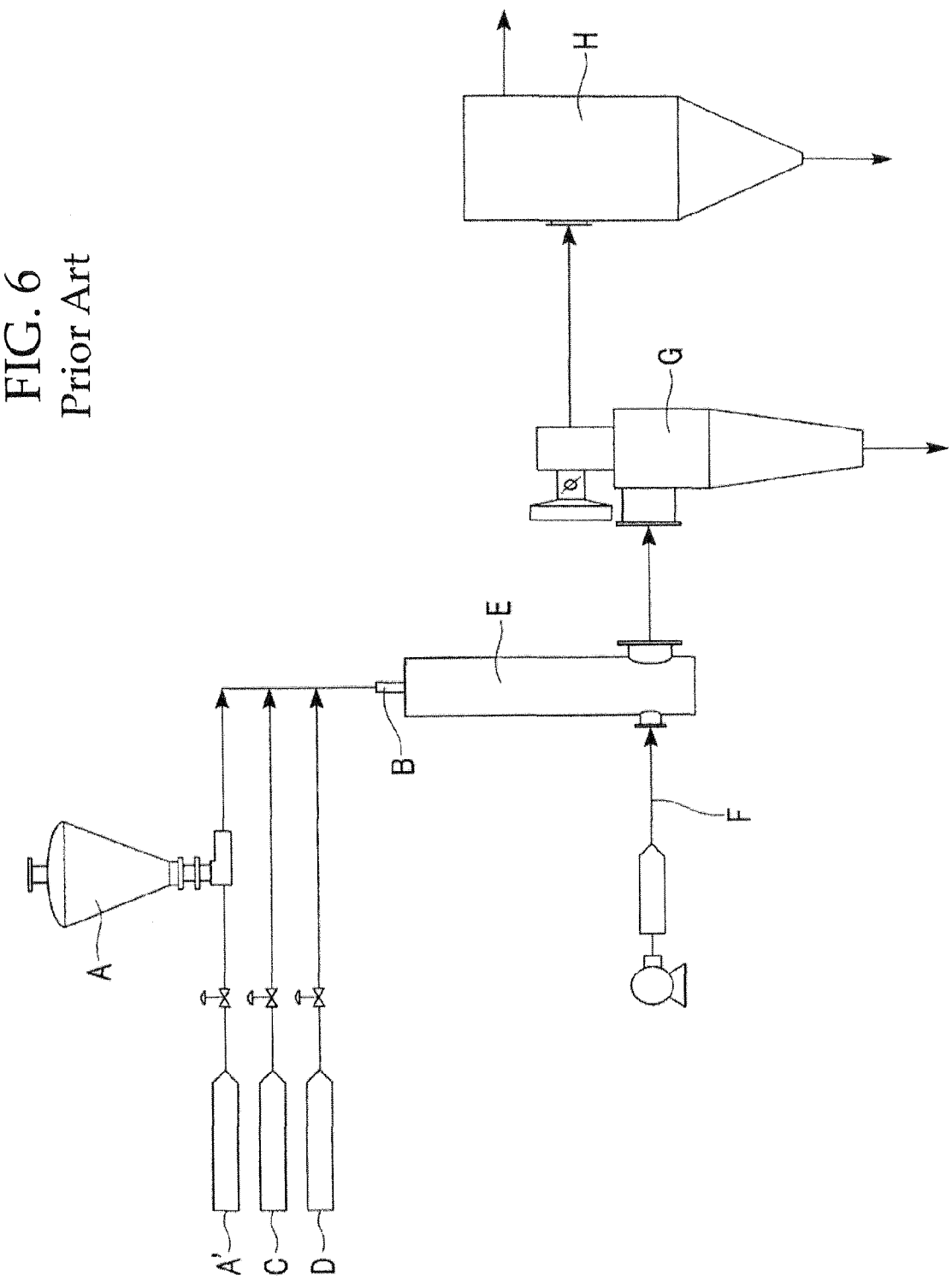
FIG. 6 is a schematic configuration diagram illustrating a production apparatus of conventional inorganic spheroidized particles.

The results of the treatment to the raw material powder having a mean particle diameter of 30 μm and the raw material powder having a mean particle diameter of 2 μm are shown in FIG. 4, FIG. 5 and Table 1.

In the case of treating the raw material having a mean particle diameter of 30 μm, the raw material powder was ejected through the first raw material ejection hole 3. In the case of treating the raw material having a mean particle diameter of 2 μm, the raw material powder was ejected through the second raw material ejection holes 6B.

The raw material having a mean particle diameter of 30 μm was collected by the cyclone 17, while the raw material having a mean particle diameter of 2 μm was collected by the bag filter 19 without through the cyclone 17.

For comparison with the prior art, spheroidized particles were produced under the above condition using the same type as that of the inorganic material spheroidization apparatus described in Patent Literature 3.

TABLE 1

| Mean particle diameter of raw material powder [μm] | Primary oxygen [%] | Secondary oxygen [%] | Throughput capacity [kg/h] | Mean particle diameter of spheroidized particles [μm] | |
|---|---|---|---|---|---|
| | | | | Prior art | The present invention |
| 30 | 25 | 75 | 20 | 36 | 31 |
| 2 | 40 | 60 | 20 | 7 | 3 |

As a result, as shown in FIG. 4 and FIG. 5, the vitrification ratio of 98% or more could not be obtained under the condition of 50% or more (primary oxygen) and 50% or less (secondary oxygen) using raw materials having any particle diameter.

Also, in comparison with the prior art, a significant difference was not recognized with respect to an influence of primary oxygen and secondary oxygen.

The results shown in Table 1 revealed that inorganic spheroidized particles having a diameter more close to that of the raw material can be obtained by using a burner in the present invention.

Example 2

Using a silica powder as a raw material powder, three kinds of raw material powders, for example, a raw material powder A having a mean particle diameter of 15 μm, a raw material powder B having a mean particle diameter of 2 μm, and a raw material powder C having a mean particle diameter of 5 μm obtained by mixing 35% by weight of the raw material powder A with 65% by weight of the raw material powder B were prepared.

Using a burner of the prior art described in Patent Literature 3, a raw material powder C at 20 kg/h was supplied by transporting with oxygen at 7.5 Nm³/h as a carrier gas. As a fuel gas, LPG at 5 Nm³/h was supplied. Oxygen at 20 Nm³/h was supplied to produce spheroidized particles, and then a spheroidization throughput capacity that achieves a vitrification ratio of 98% or more was determined.

Using the burner of the present invention, a raw material A at 7 kg/h was transported with oxygen at 5.25 Nm³/h as a carrier gas to first raw material ejection holes 3, and a raw material B at 13 kg/h was transported with oxygen at 2.25 Nm³/h as a carrier gas to second raw material ejection holes 6B. As a fuel gas, LPG at 5 Nm³/h was supplied to fuel gas ejection holes 4B. Each half of the entire oxygen at 20 Nm³/h was dividedly introduced into primary oxygen ejection holes 5B and secondary oxygen ejection holes 7B to produce spheroidized particles, and then a spheroidization throughput capacity that achieves a vitrification ratio of 98% or more was determined.

At this time, a throughput capacity of a burner was investigated by fixing the proportion of oxygen to be supplied to the primary oxygen ejection holes 5B (primary oxygen) and the secondary oxygen ejection holes 7B (secondary oxygen) to 30% (primary oxygen) and 70% (secondary oxygen) according to the particle size of the raw material powder thereby adjusting raw material powder supply amount.

The results are shown in Table 2.

TABLE 2

|  | Mean particle diameter of raw material [μm] | Throughput capacity [kg/h] | Vitrification ratio of spheroidized particle [%] | Mean particle diameter of spheroidized particle [μm] |
|---|---|---|---|---|
| Present invention | Raw material A: 15 Raw material B: 2 | Total: 20 Raw material A: 7 Raw material B: 13 | 99 | 7 |
| Prior art | Raw material C: 5 | 16 | 98 | 10 |

The results shown in Table 2 revealed that inorganic spheroidized particles having a diameter more close to that of the raw material can be efficiently obtained by using a burner structure in the present invention.

REFERENCE SIGNS LIST

1 First raw material supply pipe
1A First raw material supply path
2 Powder diffusion plate
3 First raw material ejection hole
4 Fuel supply pipe
4A Fuel supply path
4B Combustion gas ejection holes
5 Primary oxygen supply pipe
5A Primary oxygen supply path
5B Primary oxygen ejection holes
6 Second raw material supply pipe
6A Second raw material supply path
6B Second raw material ejection hole
7 Secondary oxygen supply pipe
7A Secondary oxygen supply path
7B Secondary oxygen ejection holes
8 Combustion chamber
9 Raw material diffusion chamber
11 Spheroidization furnace
12 Burner
17 Cyclone
19 Bag filter
23 First raw material feeder
24 Carrier gas supply source
25 Second raw material feeder
26 Fuel supply source
27 Primary oxygen supply source
28 Secondary oxygen supply source

The invention claimed is:

1. A burner for production of inorganic spheroidized particles, comprising
    a first raw material supply path through which a raw material powder is supplied together with a carrier gas;
    a fuel supply path disposed around the outer circumference of the first raw material supply path, through which a fuel gas is supplied;
    a primary oxygen supply path disposed around the outer circumference of the fuel supply path, through which an oxygen-containing gas is supplied;
    a second raw material supply path disposed around the outer circumference of the primary oxygen supply path, through which a raw material powder is supplied together with a carrier gas;
    a secondary oxygen supply path disposed around the outer circumference of the second raw material supply path, through which an oxygen-containing gas is supplied;
    a raw material diffusion chamber connected to the end of the first raw material supply path through a powder diffusion plate having a lot of fine holes; and
    a combustion chamber connected to the raw material diffusion chamber, that has a radially expanded exit side, wherein
    each of the ends of the fuel supply path, the primary oxygen supply path, the second raw material supply path and the secondary oxygen supply path is opened to a conical wall surface of the combustion chamber,
    openings of the fuel supply path are ejection holes that eject a fuel in parallel to a central axis of the burner from the wall surface of the combustion chamber,
    openings of the primary oxygen supply path are primary oxygen ejection holes that eject an oxygen-containing gas in a direction of formation of rotational flow in the combustion chamber from the wall surface of the combustion chamber,
    openings of the second raw material supply path are ejection holes opened to the end side of the burner from the primary oxygen ejection holes, and
    openings of the secondary oxygen supply path are ejection holes opened to the end side of the burner from second raw material ejection holes.

2. An apparatus for production of inorganic spheroidized particles, comprising:
    a vertical spheroidization furnace equipped with the burner according to claim 1 at the top portion of the furnace in a vertically downward direction; and a cyclone and a bag filter that are disposed at the downstream side of the spheroidization furnace to collect inorganic spheroidized particles.

3. The apparatus for production of inorganic spheroidized particles according to claim 2, which is equipped with control means for independently controlling a carrier gas and a raw material powder that are supplied to a first raw material supply path and a second raw material supply path of the burner, respectively.

4. The apparatus for production of inorganic spheroidized particles according to claim 2, which includes a path that is connected to a bag filter through a cyclone, and a path that is connected to the bag filter without through the cyclone, each path being switchable.

5. The apparatus for production of inorganic spheroidized particles according to claim 2, which is provided with two raw material supply devices of supplying raw material powders each having a different particle diameter in the first raw material supply path and the second raw material supply path of the burner.

6. The apparatus for production of inorganic spheroidized particles according to claim 2, wherein the cyclone collects coarse particles, and the bag filter collects fine particles.

7. The apparatus for production of inorganic spheroidized particles according to claim 2, the bag filter collects particles in one lump.

\* \* \* \* \*